US007886585B2

(12) United States Patent
McLain et al.

(10) Patent No.: US 7,886,585 B2
(45) Date of Patent: Feb. 15, 2011

(54) INTAKE AIR TEMPERATURE SENSOR DIAGNOSTIC SYSTEMS WITH ADAPTIVE LEARNING MODULES

(75) Inventors: Kurt D. McLain, Clarkston, MI (US); Wenbo Wang, Novi, MI (US)

(73) Assignee: GM Global Technology Operations, Inc.

( * ) Notice: Subject to any disclaimer, the term of this patent is extended or adjusted under 35 U.S.C. 154(b) by 391 days.

(21) Appl. No.: 12/179,682

(22) Filed: Jul. 25, 2008

(65) Prior Publication Data

US 2010/0010722 A1 Jan. 14, 2010

Related U.S. Application Data

(60) Provisional application No. 61/079,455, filed on Jul. 10, 2008.

(51) Int. Cl.
*G01M 15/04* (2006.01)

(52) U.S. Cl. .................................................. 73/114.31

(58) Field of Classification Search ............. 73/114.31, 73/114.32, 114.34
See application file for complete search history.

(56) References Cited

U.S. PATENT DOCUMENTS 7,369,937 B1 * 5/2008 Wang et al. ................ 701/114

* cited by examiner

*Primary Examiner*—Eric S McCall

(57) ABSTRACT

A diagnostic system for an internal combustion engine includes an intake air temperature (IAT) determination module, a reference temperature determination module, and an adaptive learning module. The IAT determination modules determines a first IAT using an IAT sensor at a first time and determines a second IAT using the IAT sensor at a second time. The reference temperature determination module determines a first frequency based on a first voltage output of a MAF sensor at the first time and determines a second frequency based on a second voltage output of the MAF sensor at the second time. The adaptive learning module determines a temperature-frequency relationship based on the first IAT, the second IAT, the first frequency and the second frequency.

20 Claims, 4 Drawing Sheets

INTAKE AIR TEMPERATURE SENSOR DIAGNOSTIC SYSTEMS WITH ADAPTIVE LEARNING MODULES

CROSS-REFERENCE TO RELATED APPLICATIONS

This application claims the benefit of U.S. Provisional Application No. 61/079,455, filed on Jul. 10, 2008. The disclosure of the above application is incorporated herein by reference.

FIELD

The present disclosure relates to engine diagnostic systems, and more specifically to intake air temperature sensor diagnostic systems with adaptive learning modules.

BACKGROUND

The statements in this section merely provide background information related to the present disclosure and may not constitute prior art.

Internal combustion engines combust a fuel and air mixture to produce drive torque. More specifically, air is drawn into the engine through a throttle. The air is mixed with fuel and the air and fuel mixture is compressed within a cylinder using a piston. The air and fuel mixture is combusted within the cylinder to reciprocally drive the piston within the cylinder, which in turn rotationally drives a crankshaft of the engine.

Engine operation is regulated based on several parameters including, but not limited to, intake air temperature (IAT), manifold absolute pressure (MAP), throttle position (TPS), engine RPM and barometric pressure ($P_{BARO}$). With specific reference to the throttle, the state parameters (e.g., air temperature and pressure) before the throttle may be used for engine control and diagnostic systems. The internal combustion engines may include an IAT sensor that directly measures the IAT. In some instances, however, the IAT sensor can become inaccurate as a result of damage, wear and/or other factors. Accordingly, the IAT sensor may be monitored to determine whether the IAT that is determined based on the IAT sensor reading is accurate.

The internal combustion engine systems may include a second IAT sensor. The reading from the second IAT sensor is compared with that of the first IAT sensor to determine whether the first IAT sensor is accurate. This additional IAT sensor, however, increases cost and complexity and must also be monitored for accuracy.

SUMMARY

Accordingly, a diagnostic system for an internal combustion engine includes an intake air temperature (IAT) determination module, a reference temperature determination module, and an adaptive learning module. The IAT determination modules determines a first IAT using an IAT sensor at a first time and determines a second IAT using the IAT sensor at a second time. The reference temperature determination module determines a first frequency based on a first voltage output of a MAF sensor at the first time and determines a second frequency based on a second voltage output of the MAF sensor at the second time. The adaptive learning module determines a temperature-frequency relationship based on the first IAT, the second IAT, the first frequency and the second frequency.

A diagnostic system for an internal combustion engine includes an intake air temperature (IAT) determination module, a reference temperature determination module, and an adaptive learning module. The IAT determination module determines a first IAT using an IAT sensor at a first time. The reference temperature determination module determines a first frequency based on a first voltage output of a MAF sensor at the first time. The adaptive learning module determines a correction valve based on the first temperature and the first frequency. The reference temperature determination module determines a reference temperature based on a predetermined linear temperature-frequency relationship and the correction value.

A method of diagnosing an intake air temperature (IAT) sensor includes: determining a first IAT using the IAT sensor at a first time; determining a first frequency based on a first output voltage of an MAF sensor at the first time; determining a second IAT using the IAT sensor at a second time; determining a second frequency based on a second output voltage of the MAF at the second time; and determining a temperature-frequency relationship based on the first IAT, the second IAT, the first frequency, and the second frequency.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
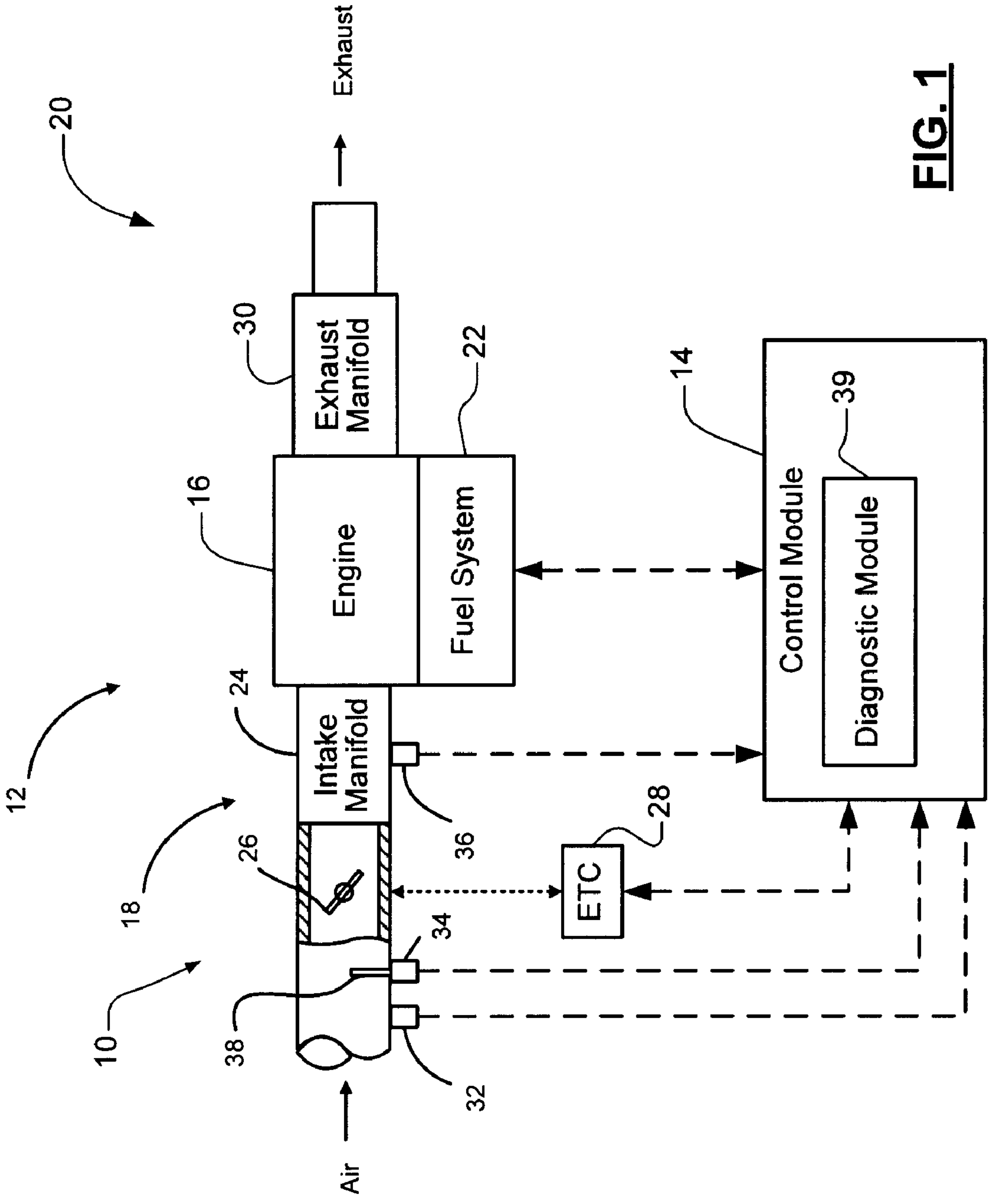
FIG. 1 is a schematic illustration of a vehicle that includes a diagnostic system according to the present disclosure.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

An intake air temperature sensor diagnostic system of the present disclosure determines a learned linear temperature-frequency relationship (i.e., correlation) between a frequency based on an output voltage of a mass air flow (MAF) sensor and an intake air temperature (IAT). The learned linear correlation is obtained, for example only, when an engine or a control module of the engine is new and first in use. The intake air temperature sensor diagnostic system records a first frequency and a first IAT obtained when vehicle ignition is turned on for the first time and corrects an offset of the linear relationship based on the first frequency and the first IAT.

Referring to FIG. 1, a vehicle 10 includes an engine assembly 12 and a control module 14. The engine assembly 12 includes an engine 16, an intake system 18, an exhaust system 20, and a fuel system 22. The intake system 18 communicates with the engine 16 and includes an intake manifold 24, a throttle 26, and an electronic throttle control (ETC) 28. The ETC 28 actuates the throttle 26 to control an air flow into engine 16. The exhaust system 20 communicates with the engine 16 and includes an exhaust manifold 30. The fuel system 22 provides fuel to the engine 16. Exhaust gas created by combustion of the air/fuel mixture exits the engine 16 through the exhaust system 20.

The control module 14 communicates with the fuel system 22, the ETC 28, an intake air temperature (IAT) sensor 32, a mass air flow (MAF) sensor 34, and a manifold absolute pressure (MAP) sensor 36. The IAT sensor 32 provides a signal to the control module 14 indicative of an intake air temperature. The MAF sensor 34 provides a signal to the control module 14 indicative of a mass air flow into engine 16. The MAP sensor 36 provides a signal to the control module 14 indicative of a manifold absolute pressure.

The MAF sensor 34 may be a hot wire air flow meter. The MAF sensor 34 may include a Wheatstone thermocouple bridge 38 positioned in the intake air flow path provided to the intake manifold 24 and may include a first side having a heated sensing element and calibration resistors and a second side having an air temperature sensitive resistor and calibration resistors.

The heated element may include a wire or a film. A voltage is applied to the heated element to maintain a predetermined temperature and balance the bridge 38. As air flow across the heated element increases, the electric power required to maintain the predetermined temperature increases. As air flow across the bridge decreases, the electric power required to maintain the predetermined temperature decreases. Accordingly, the voltage output across the bridge 38 provides an indication of the mass flow rate of air across the bridge 38. The temperature sensitive resistor may compensate the air flow determination based on an ambient air temperature.

The control module 14 includes a diagnostic module 39. The diagnostic module 39 monitors the output voltage of the Wheatstone bridge 38 and the IAT measured by the IAT sensor 32 during a no-flow condition to determine whether the IAT reading by the IAT sensor 32 is accurate. The no-flow condition is present when the engine 16 is in a non-operating condition, which will be described below.

Figure 2:
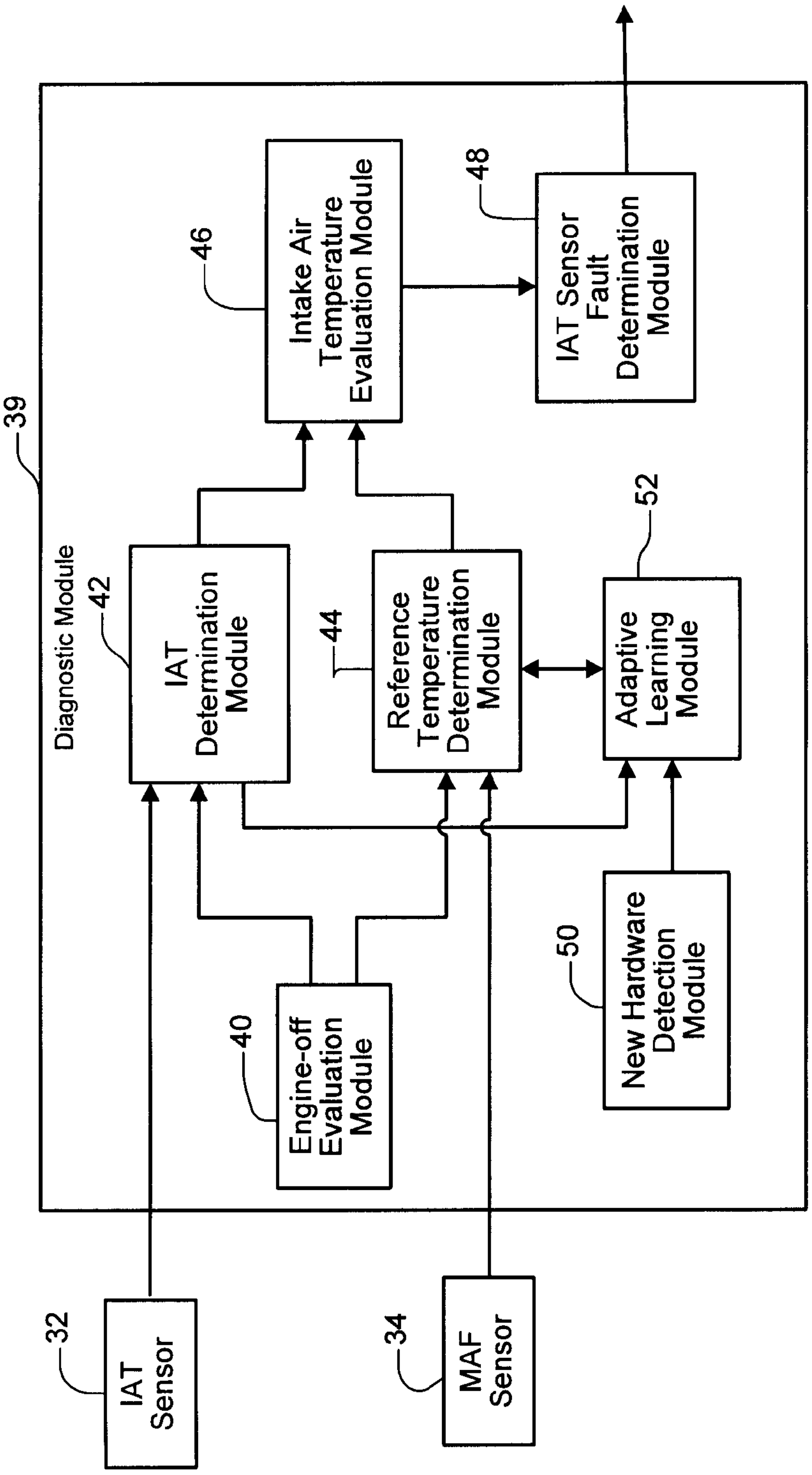
FIG. 2 is a control block diagram of a diagnostic system according to the present disclosure.

Referring to FIG. 2, the diagnostic module 39 includes an engine-off evaluation module 40, an intake air temperature (IAT) determination module 42, a reference temperature determination module 44, an intake air temperature evaluation module 46, an IAT sensor fault determination module 48, a new hardware detection module 50, and an adaptive learning module 52.

The IAT determination module 42 communicates with the IAT sensor 32 and obtains an intake air temperature IAT based on the IAT sensor 32. The reference temperature determination module 44 communicates with the MAF sensor 34 and obtains an output voltage of the Wheatstone bridge.

The bridge output voltage may be converted to a pulse modulated signal. The frequency of the pulse modulated signal may be interpreted by the control module 14 as an air flow value. The frequency obtained during a no-flow condition may additionally be used to determine a reference temperature $T_{REF}$ for diagnosing the IAT sensor 32.

When the engine 16 is in a non-operating condition, there may be generally zero flow into the engine 16 through the intake manifold 24. As such, there is generally no flow across the MAF sensor 34, and therefore the bridge 38. During this no-flow condition (i.e., engine non-operating condition), the heat from the heated element is dissipated into the air surrounding the heated element in the intake system 18. The bridge 38 outputs a low voltage and is balanced mainly based on the temperature of the surrounding air in intake system 18.

When the no-flow condition is present, a linear relationship generally exists between the frequency based on the bridge output voltage and the temperature of the surrounding air in the intake system 18. The frequency provided by the bridge output voltage may be directly or inversely proportional to the air temperature in the intake system 18 depending on the construction of the MAF sensor 34 and the IAT sensor 32. Therefore, the frequency of the MAF sensor 34 provides an indication of whether the IAT reading is accurate. Using the frequency of the MAF sensor to diagnose the IAT sensor has been disclosed in a co-pending application Ser. No. 11/945,608, entitled “Intake Air Temperature Diagnostic System,” which is assigned to the present assignee, and the disclosure of which is incorporated herein by reference in its entirety.

The adaptive learning module 52 may determine a learned frequency-temperature correlation. Generally, a linear relationship is present between frequency signals from the MAF sensor 34 and an air temperature in the intake system 18 during a no-flow condition. The learned frequency-temperature correlation may be used to determine a reference temperature to diagnose the IAT sensor 32.

The adaptive learning module 52 is activated when a learning condition is present. For example, the learning condition may be present when the new hardware detection module 50 detects the presence of a new engine, a new control module, a new IAT sensor, and/or a new MAF sensor. When the vehicle ignition is turned on, the adaptive learning module 52 obtains a first IAT from the IAT determination module 42 and a first frequency from the reference temperature determination module 44. The IAT sensor 32 measures the IAT. The frequency is based on the output voltage of the MAF sensor 34.

Thereafter, the engine is turned on and cooled off for a predetermined period of time. The adaptive learning module 52 obtains a second IAT from the IAT determination module 42 and a second frequency from the reference temperature determination module 52. The adaptive learning module 42 determines a learned linear frequency-temperature correlation based on the first IAT, the second IAT, the first frequency, and the second frequency. The learned frequency-temperature correlation may be used for the life of the engine and/or the control module and may be recorded in the reference temperature determination module 44. The learning process may be repeated when a new IAT sensor and/or a new MAF sensor is installed.

Alternatively, the linear frequency-temperature relationship may be predetermined prior to the learning process. The frequency-temperature relationship may be predetermined during manufacturing of the engine, for example only, during engine testing. The slope of the linear relationship is generally the same among different engines. The intake air temperature, however, may not correspond to the same frequency value from the MAF sensors in different engines. In other words, the linear relationship between the frequency and the IAT may be shifted due to part-to-part variations among engines. The shift may also be present in the same engine when a new IAT sensor or a new MAF sensor is installed. The adaptive learning module 52 may determine a learned offset (i.e. the shift) from the line that represents a predetermined frequency-temperature relationship in the coordinate system.

To learn the offset, the adaptive learning module 52 is activated when a learning condition is present. For example, the learning condition may be present when the new hardware detection module 50 detects the presence of a new engine, a new control module, a new IAT sensor, and/or a new MAF sensor. When the vehicle ignition is turned on, the adaptive learning module 52 obtains a first IAT from the IAT determination module 42 based on the IAT sensor 32 and a first frequency from the reference temperature determination module 44. The first frequency and the first IAT are stored as a learned correction value to determine the offset from the predetermined linear temperature-frequency relationship.

In either method, the learned correction value (i.e., offset) is used to scale a measured frequency from the MAF sensor 34 and a measured IAT from the IAT sensor 32 during diagnosis to correct part-to-part variations among engines.

Alternatively, the new hardware detection module 52 may be eliminated and an activation module may be provided in an external diagnostic tool. When a new IAT sensor 32 or a new MAF sensor is installed, the diagnostic tool may be manually plugged into the control module 14 to activate the adaptive learning module 52. The adaptive learning module 52 then performs the learning process as previously described.

When the engine-off evaluation module 40 detects a no-flow condition suitable for IAT sensor diagnosis, the IAT determination module 42 may determine an IAT based on the IAT sensor 32. The reference temperature determination module 44 may determine a frequency based on the output voltage of the MAF sensor 34. The frequency is scaled based on the learned correction value. The frequency may be converted into a reference temperature $T_{REF}$ using the learned or predetermined frequency-temperature relationship. The intake air temperature evaluation module 46 then compares the IAT with the $T_{REF}$. When a temperature difference ($\Delta T$) between IAT and $T_{REF}$ (($\Delta T=|IAT-T_{REF}|$) exceeds a threshold value, the IAT sensor fault determination module 48 may diagnose a fault in the IAT sensor 32.

Figure 3A:
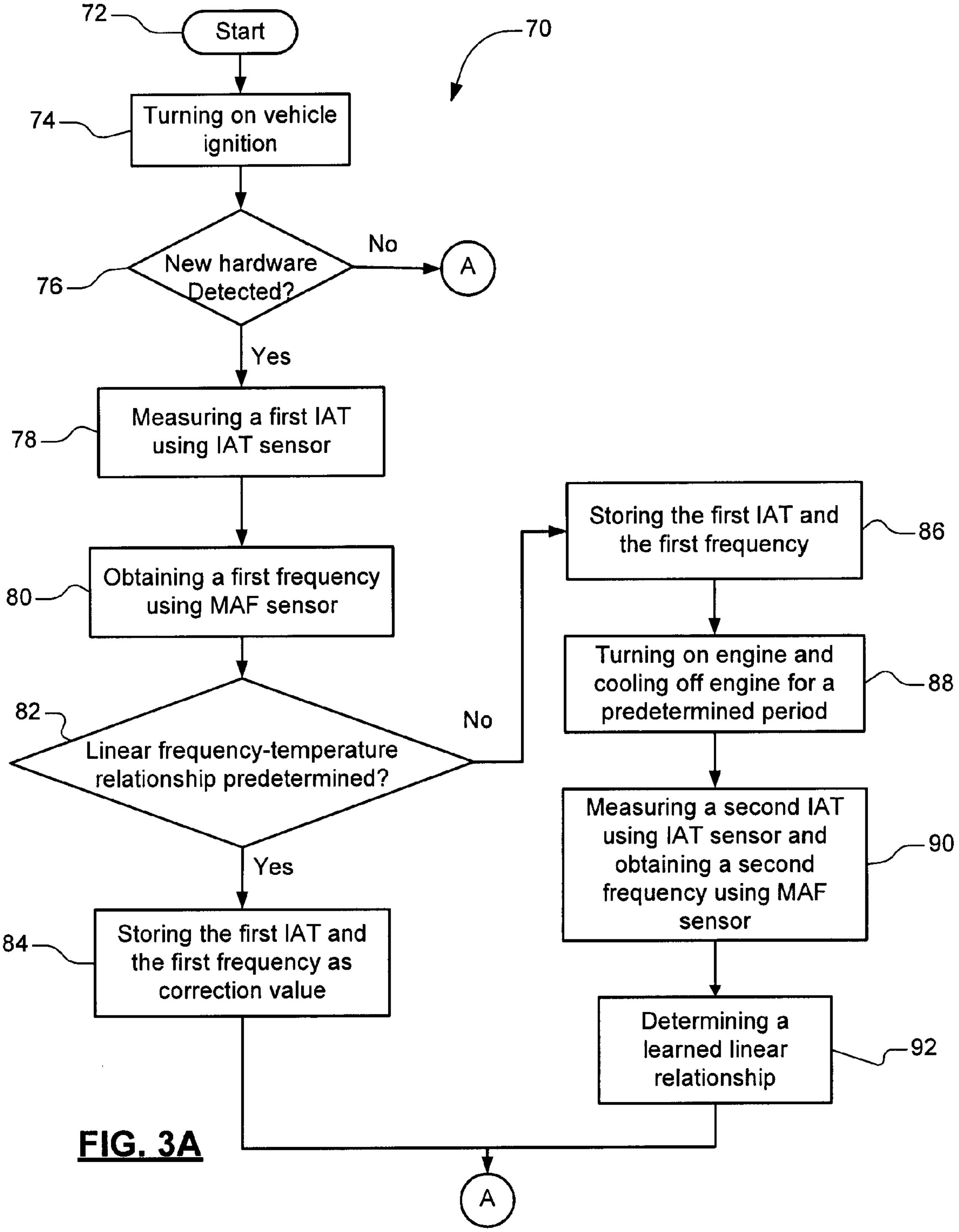
FIGS. 3A and 3B are a flow diagram illustrating a method of diagnosing an intake air temperature sensor according to the present disclosure.

As shown in FIG. 3A, a method 70 of diagnosing an IAT sensor starts in step 72. The vehicle ignition is turned on in step 74. When the new hardware detection module 50 does not detect the presence of a new engine and/or a new control module in step 76, a learning condition does not exist and the diagnostic module may proceed to diagnose the IAT sensor if a no-flow condition exists. When the new hardware detection module 50 detects the presence of a new engine and/or a new control module in step 76, the adaptive learning module records a first IAT from the IAT determination module 42 based on the IAT sensor 32 in step 78. The adaptive learning module 52 also records a first frequency from the reference temperature determination module 44 in step 80. If the diagnostic module 39 determines that a temperature-frequency relationship is already stored in the reference temperature determination module in step 82, the first IAT and the first frequency are recorded as a learned correction value in step 84. The learned correction valve determines an offset from the predetermined temperature relationship. The reference temperature determination module may later use the predetermined temperature-frequency relationship and the learned correction value for diagnosis.

If no predetermined temperature-frequency relationship is stored in the reference temperature determination module, the reference temperature determination module need to learn the temperature-frequency relationship. The reference temperature module stores the first temperature and the first frequency in step 86. The engine is later run and cooled off in step 88. After the engine is cooled off for a predetermined period, the adaptive learning module obtains a second IAT from the IAT determination module 42 and a second frequency from the reference temperature determination module 44 in step 90. The adaptive learning module 52 obtains a learned frequency-temperature relationship based on the first IAT, the second IAT, the first frequency, and the second frequency in step 92.

Figure 3B:
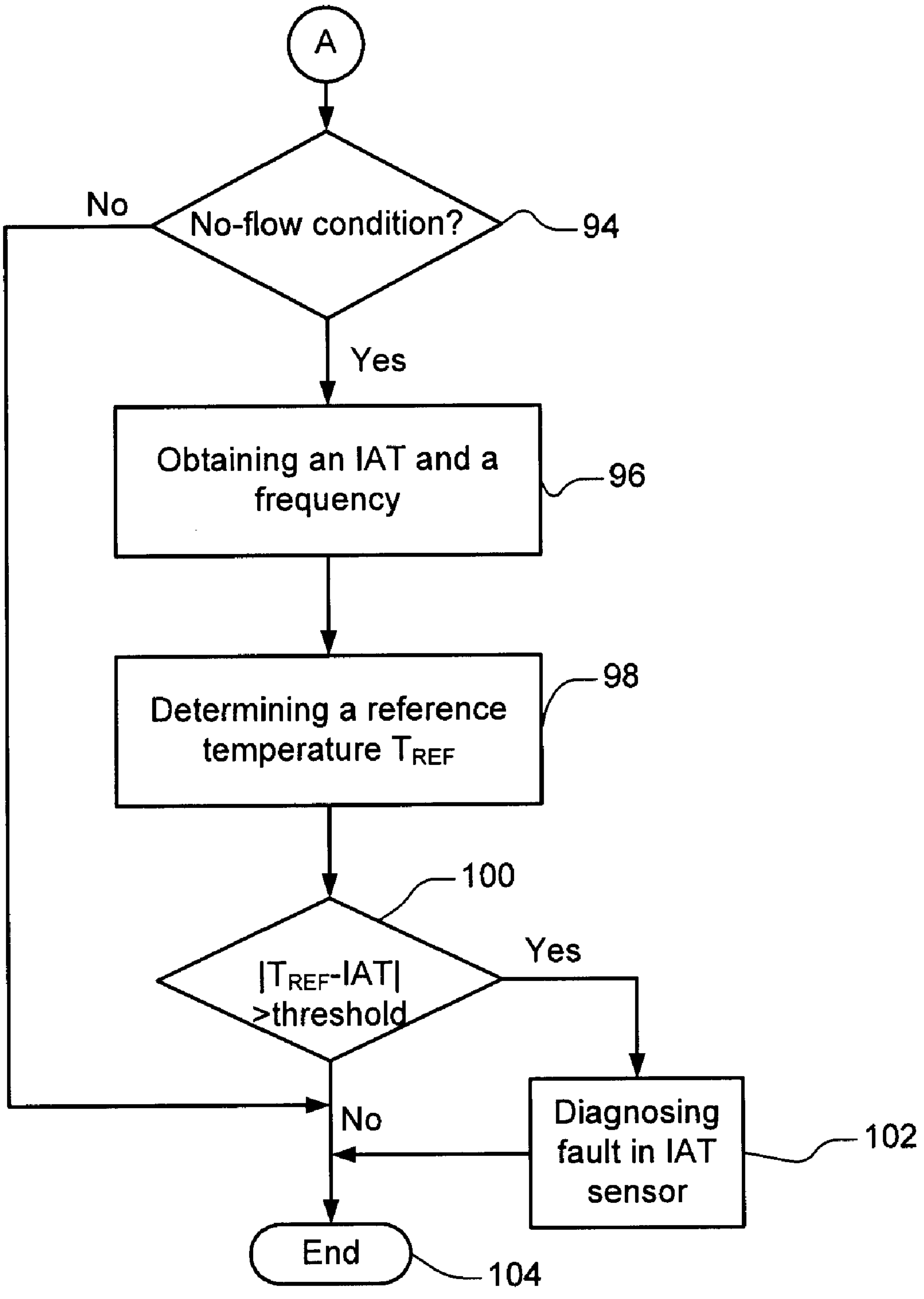

As shown in FIG. 3B, the IAT sensor diagnosis may start when the engine-off evaluation module determines a no-flow condition in step 94. The IAT determination module determines an IAT and the reference temperature determination module determines a frequency based on the MAF sensor 34 in step 96. The reference temperature determination module determines a reference temperature ($T_{REF}$) in step 98. If the temperature-frequency relationship is predetermined prior to the learning process, the reference temperature module scales the measured frequency by using the learned correction value and converts the scaled frequency into $T_{REF}$ by using the predetermined temperature-frequency relationship. If the temperature-frequency relationship is learned during the learning process, the reference temperature module determines the reference temperature $T_{REF}$ by using the learned temperature-frequency relationship. When the intake air temperature evaluation module determines that $|T_{REF}-IAT|$ exceeds a threshold value in step 100, the IAT sensor fault determination module 48 may diagnose a fault in step 102. If $|T_{REF}-IAT|$ does not exceed the threshold value, the method ends in step 104.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A diagnostic system for an internal combustion engine comprising:

an intake air temperature (IAT) determination module that determines a first IAT using an IAT sensor at a first time and that determines a second IAT using the IAT sensor at a second time;

a reference temperature determination module that determines a first frequency based on a first voltage output of a MAF sensor at the first time and that determines a second frequency based on a second voltage output of the MAF sensor at the second time; and an adaptive learning module that determines a temperature-frequency relationship based on the first IAT, the second IAT, the first frequency and the second frequency.

2. The diagnostic system of claim 1 wherein the first IAT and the first frequency are determined when the vehicle ignition is turned on and before the engine is started.

3. The diagnostic system of claim 1 wherein the second IAT and the second frequency are determined after the engine is run and is off for a predetermined period.

4. The diagnostic system of claim 1 wherein the reference temperature determination module determines a third frequency based on a third voltage output of the MAF sensor at a third time and converts the third frequency into a reference temperature ($T_{REF}$) based on the temperature-frequency relationship.

5. The diagnostic system of claim 4 wherein the IAT determination module determines a third IAT using the IAT sensor at the third time, and further comprising an IAT sensor fault determination module that diagnoses a fault in the IAT sensor when a difference between the third IAT and the $T_{REF}$ exceeds a threshold value.

6. The diagnostic system of claim 1 further comprising a new hardware detection module that activates the adaptive learning module when the new hardware detection module detects that at least one of the engine, the diagnostic system, the IAT sensor, and the mass air flow sensor is replaced.

7. A diagnostic system for an internal combustion engine comprising:

an intake air temperature (IAT) determination module that determines a first IAT using an IAT sensor at a first time;

a reference temperature determination module that determines a first frequency based on a first voltage output of a MAF sensor at the first time; and an adaptive learning module that determines a correction valve based on the first temperature and the first frequency, wherein the reference temperature determination module determines a reference temperature based on a predetermined linear temperature-frequency relationship and the correction value.

8. The diagnostic system of claim 7 wherein the predetermined linear temperature-frequency relationship is stored in the reference temperature determination module during manufacturing of the engine.

9. The diagnostic system of claim 7 wherein the reference temperature determination module determines a second frequency based on a second voltage output of the MAF sensor at a second time and scales the second frequency based on the correction valve to obtain a scaled frequency.

10. The diagnostic system of claim 9 wherein the reference temperature determination module converts the scaled frequency into a reference temperature ($T_{REF}$) based on the predetermined linear temperature-frequency relationship.

11. The diagnostic system of claim 10 wherein the IAT determination module determines a second IAT using the IAT sensor at the second time, and further comprising an IAT sensor fault determination module that diagnoses a fault in the IAT sensor when a difference between the second IAT and the $T_{REF}$ exceeds a threshold value.

12. A method of diagnosing an intake air temperature (IAT) sensor comprising:

determining a first IAT using the IAT sensor at a first time;

determining a first frequency based on a first output voltage of an MAF sensor at the first time;

determining a second IAT using the IAT sensor at a second time;

determining a second frequency based on a second output voltage of the MAF at the second time; and determining a temperature-frequency relationship based on the first IAT, the second IAT, the first frequency, and the second frequency.

13. The method of claim 12 wherein the first IAT and the first frequency are determined when the vehicle ignition is turned on and before the engine is started.

14. The diagnostic system of claim 12 wherein the second IAT and the second frequency are determined after the engine is run and is off for a predetermined period.

15. The diagnostic system of claim 12 further comprising recording a correction valve based on the first IAT and the first frequency.

16. The method of claim 12 further comprising determining a third frequency based on a third output voltage of the MAF sensor at a third time.

17. The method of claim 16 further comprising converting the third frequency into a reference temperature $T_{REF}$ based on the temperature-frequency relationship.

18. The method of claim 17 further comprising determining a third IAT using the IAT sensor at the third time and diagnosing a fault in the IAT sensor when a difference between the third IAT and the $T_{REF}$ exceeds a threshold value.

19. The method of claim 18 wherein the third frequency and the third IAT are determined when the engine is in a non-operating condition.

20. The method of claim 12 further comprising activating the adaptive learning module when at least one of the intake air temperature sensor, a mass air flow sensor, an engine, and a control module is replaced.

* * * * *